(12) United States Patent
Vandenborre et al.

(10) Patent No.: US 9,972,846 B2
(45) Date of Patent: May 15, 2018

(54) BIPOLAR ELECTRODE AND METHOD FOR PRODUCING SAME

(71) Applicant: SOLVAY SA, Brussels (BE)

(72) Inventors: Hugo Jan Baptist Vandenborre, Kasterlee (BE); Eric Dubois, Wasseiges (BE); Nicola Zandona, Namur (BE)

(73) Assignee: SOLVAY SA, Brussels (BE)

( * ) Notice: Subject to any disclaimer, the term of this patent is extended or adjusted under 35 U.S.C. 154(b) by 358 days.

(21) Appl. No.: 14/408,583

(22) PCT Filed: Jun. 20, 2013

(86) PCT No.: PCT/EP2013/062938
§ 371 (c)(1),
(2) Date: Dec. 17, 2014

(87) PCT Pub. No.: WO2013/190066
PCT Pub. Date: Dec. 27, 2013

(65) Prior Publication Data
US 2015/0200401 A1 Jul. 16, 2015

(30) Foreign Application Priority Data

Jun. 20, 2012 (EP) .................................... 12172835

(51) Int. Cl.
*C25B 11/02* (2006.01)
*C25B 1/10* (2006.01)
(Continued)

(52) U.S. Cl.
CPC ................ *H01M 4/86* (2013.01); *C25B 1/10* (2013.01); *C25B 1/46* (2013.01); *C25B 9/066* (2013.01);
(Continued)

(58) Field of Classification Search
USPC .......................................................... 204/289
See application file for complete search history.

(56) References Cited

U.S. PATENT DOCUMENTS 1,053,266 A * 2/1913 Barstow .................. C25B 11/02
204/256
1,070,454 A * 8/1913 Griswold, Jr. .......... C25B 9/206
204/254
(Continued)

FOREIGN PATENT DOCUMENTS

CA 2062739 A1 * 12/1990 ............... C25B 9/06
CN 1143692 A 2/1997
(Continued)

OTHER PUBLICATIONS

Japanese Office Action from Corresponding JP Application No. 2015-517774, dated Feb. 7, 2017.
(Continued)

Primary Examiner — Harry D Wilkins, III
(74) Attorney, Agent, or Firm — Workman Nydegger

(57) ABSTRACT

Bipolar electrode (100) for use in an electrolysis unit, said bipolar electrode (100) comprising a planar main body having a first side and a second side, each of said first side and said second side being provided with a corresponding pattern of protrusions (125), wherein each of said protrusions has a geometrical base within the plane of said planar main body and a substantially planar top side (129), the orthogonal projection of said top side onto said main body being contained in said geometrical base, and wherein the top sides (129) of the respective protrusions (129) of said first side and said second side lie in two planes parallel to said planar main body, the electrode being further characterized by specific shape and orientation requirements.
(Continued)

Method for producing the bipolar electrode as above described, which includes an embossing step.

12 Claims, 7 Drawing Sheets

(51) Int. Cl.
    *H01M 4/86*     (2006.01)
    *C25B 11/04*     (2006.01)
    *C25B 1/46*     (2006.01)
    *C25B 9/06*     (2006.01)
    *H01M 4/88*     (2006.01)
    *H01M 8/0656*     (2016.01)
    *H01M 8/1004*     (2016.01)
    *H01M 8/0204*     (2016.01)
    *H01M 8/026*     (2016.01)

(52) U.S. Cl.
    CPC .......... *C25B 11/02* (2013.01); *C25B 11/0447* (2013.01); *H01M 4/8875* (2013.01); *H01M 8/0656* (2013.01); *H01M 8/1004* (2013.01); *H01M 8/0204* (2013.01); *H01M 8/026* (2013.01); *Y02E 60/366* (2013.01); *Y10T 29/49002* (2015.01)

(56) References Cited

U.S. PATENT DOCUMENTS

| | | | |
|---|---|---|---|
| 1,328,981 A | 1/1920 | Benjamin | |
| 2,713,314 A | 7/1955 | Leuthesser, Jr. | |
| 3,251,756 A * | 5/1966 | Miller | C25B 1/00 205/550 |
| 4,039,409 A | 8/1977 | Laconti | |
| 4,057,479 A | 11/1977 | Campbell | |
| 5,145,752 A | 9/1992 | Goldstein et al. | |
| 5,484,514 A * | 1/1996 | Katayama | C25B 15/08 204/255 |
| 6,214,181 B1 * | 4/2001 | Iacopetti | C25B 9/206 204/252 |
| 8,137,514 B2 * | 3/2012 | Kim | A61M 11/02 204/271 |
| 8,277,623 B2 * | 10/2012 | Kato | C25B 1/13 204/176 |
| 8,709,222 B2 * | 4/2014 | Gilmore | C02F 1/46109 204/229.6 |
| 2007/0105000 A1 | 5/2007 | Chapman et al. | |
| 2008/0038619 A1 | 2/2008 | Takagi et al. | |

FOREIGN PATENT DOCUMENTS

| | | |
|---|---|---|
| EP | 0625591 A2 | 11/1994 |
| EP | 2424105 A2 | 2/2012 |
| JP | H04507433 A | 12/1992 |
| JP | H0649675 A | 2/1994 |
| JP | 2002348694 A | 12/2002 |
| JP | 2006527906 A | 12/2006 |
| JP | 2010540776 A | 12/2010 |
| TW | 200812142 A | 3/2008 |
| WO | 9100379 A1 | 1/1991 |
| WO | 2009043600 A1 | 4/2009 |

OTHER PUBLICATIONS

Chinese Office Action from Chinese Application No. 201380043920.5, dated Mar. 27, 2017.
Chinese Office Action from Chinese Application No. 201380043920.5, dated Jun. 21, 2016.
Taiwanese Office Action from Taiwanese Application No. 102121545, dated Oct. 12, 2016.
European Office Communication from EP Application No. 13729781.8, dated Mar. 2, 2018.

* cited by examiner

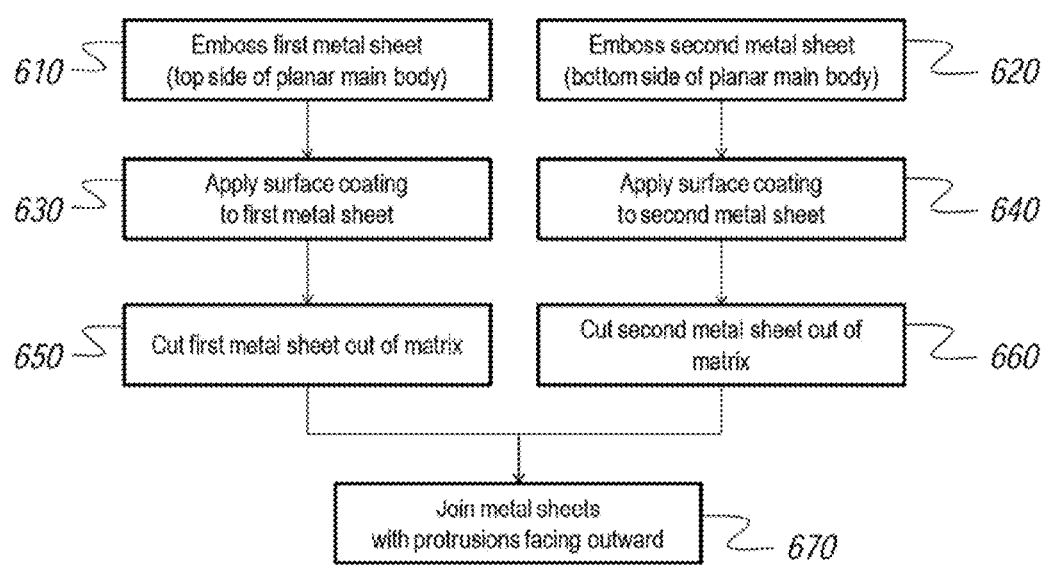

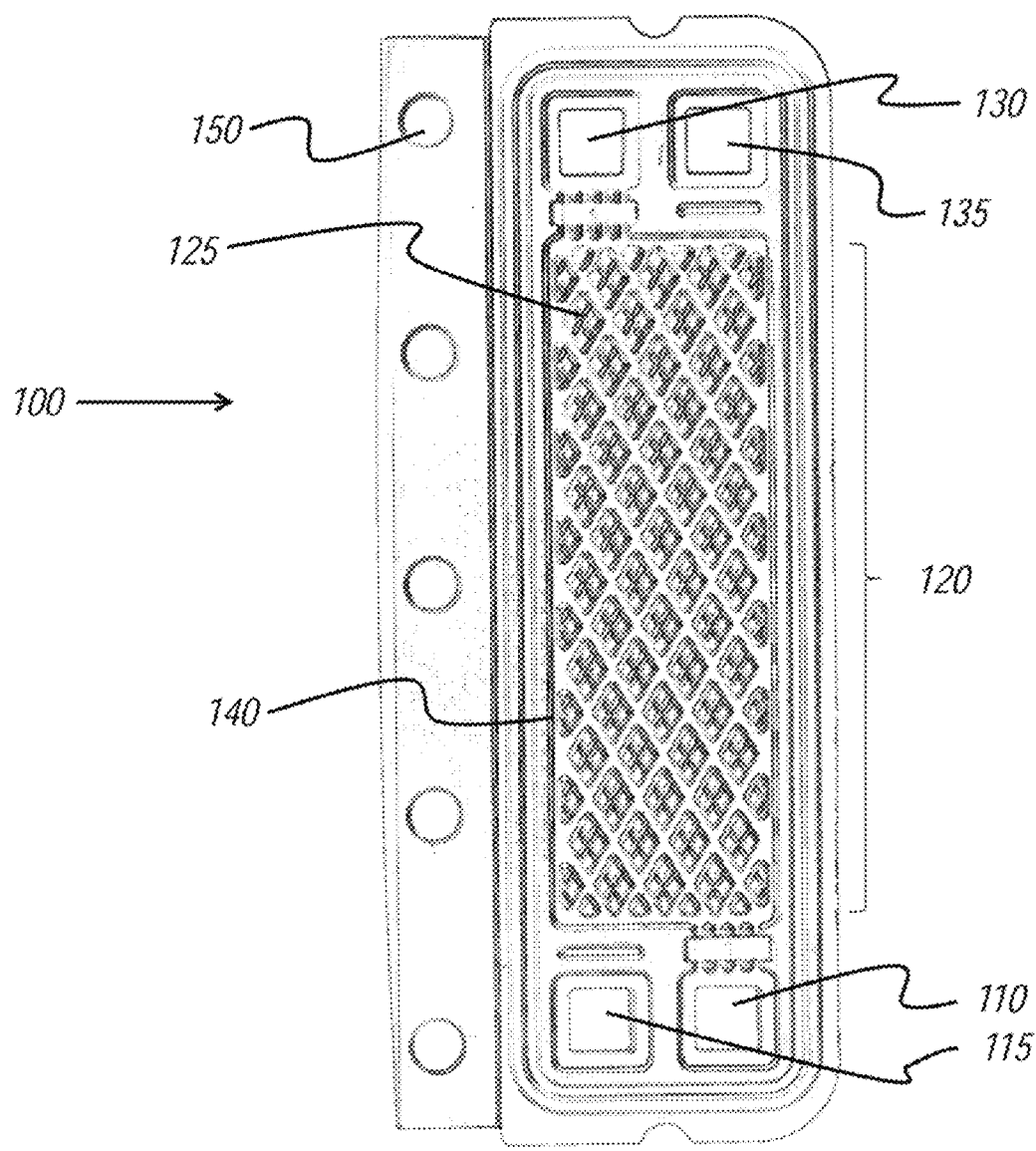

BIPOLAR ELECTRODE AND METHOD FOR PRODUCING SAME

CROSS REFERENCE TO A RELATED APPLICATION

This application is a U.S. national phase entry under 35 U.S.C. § 371 of International Application No. PCT/EP2013/062938, filed on Jun. 20, 2013, which claims priority to European application No. 12172835.6 filed Jun. 20, 2012, the whole content of this application being incorporated herein by reference for all purposes.

The present invention relates to the field of membrane-electrode assemblies (MEAs) for electrolysis cells, and in particular to the field of bipolar electrodes for use in such assemblies.

Bipolar electrodes for use in electrolysis cells are known in the art.

In the design of bipolar electrodes for use in an electrolysis unit, one must balance the competing requirements of maximizing the active area that is available for carrying out the actual electrolysis, and avoiding the trapping of gas produced by the electrolysis process, which could locally inhibit further reaction and eventually bring the electrolysis process to a halt.

To date, no satisfactory solution for the above tradeoff has been described.

It is therefore an object of the present invention to provide a bipolar electrode that provides an adequate balance between providing sufficient active area for the electrolysis process and avoiding the entrapment of produced gas, and a method for producing the same.

This object is reached by a bipolar electrode for use in an electrolysis unit, in accordance with claim 1.

The electrolysis unit for which the bipolar electrode of the invention is intended, when in use, has a direction of flow. In view of the intended use of the bipolar electrode, the electrode has a supply side and an exit side, in particular marked by the presence of a supply opening and an exit opening as will described in more detail below. Where reference is made to a direction of flow, this is meant to indicate the general direction in which the produced gas will flow when the electrode is in use in an electrolysis unit. Accordingly, the direction of flow will be the direction from the supply side towards the exit side.

In the context of the electrodes according to the present invention, "corresponding patterns" are patterns that cause the respective protrusions of the first side of one electrode and the second side of an identical electrode placed thereupon to meet, i.e. in particular patterns that are each other's mirror image.

It is an advantage of the bipolar electrode according to the invention that a high yield can be achieved while the produced hydrogen gas retains adequate mobility without the need for forced convection. Hence, the need for moving parts (e.g., pumps to generate forced convection) is avoided, and an efficient, low-maintenance electrolysis unit can be achieved.

It is an advantage of the use of polygonal protrusions with a homothetically transformed top side that material stresses caused by manufacturing are distributed in a homogenous way, which avoids the creation of points of weakness.

It is an advantage of the use of convex polygonal shapes that the protrusions don't present any "dead corners" which could constitute obstacles for a proper flow of the fluids in the reaction.

According to the invention, the polygonal shape has at least one side that is oriented in a direction substantially normal (ideally, normal) to the intended direction of flow, and the total length of the at least one side does not exceed 35% of the perimeter of the polygonal shape.

A direction is considered "substantially normal" if it is within a small angular margin around the strictly normal direction. The small angular margin is preferably no more than 10° on either side of a strictly normal direction, more preferably no more than 5° on either side, and most preferably no more than 1° on either side.

Additionally or alternatively, the polygonal shape may be oriented in such a way that a vector connecting the centroid of the polygonal shape with a corner of the latter having the smallest internal angle has a direction that is substantially parallel (ideally, parallel) to the direction of flow.

A direction is considered "substantially parallel" if it is within a small angular margin around the strictly parallel direction. The small angular margin is preferably no more than 10° on either side of a strictly parallel direction, more preferably no more than 5° on either side, and most preferably no more than 1° on either side.

These particular combinations of shape and orientation minimize the occurrence of ridges of the protrusions that would be substantially transverse to the direction of flow, which would otherwise be prone to collecting gas bubbles and impeding their natural flow.

In an embodiment of the bipolar electrode according to the present invention, the ratio of the area of the planar top side of the protrusions to the area of their respective geometric base exceeds ¼.

This ratio has given good results in experiments. Reducing the ratio to a lower number is expected to reduce the efficiency of the electrode, as the total active surface participating in the electrolysis becomes too small.

In an embodiment of the bipolar electrode according to the present invention, the pattern of protrusions is repeated on a smaller scale on the top sides of the protrusions. For example, if the protrusions are diamond-shaped, their top surfaces may further be provided with a pattern of multiple smaller diamond-shaped protrusions.

This embodiment improves the distribution of water between the different electrodes of a reactor, ensuring adequate presence of reactant to keep the electrolysis reaction going.

In an embodiment of the bipolar electrode according to the present invention, the pattern of protrusions is such that two sets of straight channels are formed, wherein the channels within each respective set have an axis in a common direction, the common direction having its main component in the intended direction of flow. In other words, if the vectors representing the direction of the axes of the channels are decomposed in a component parallel to the intended direction of flow and a component perpendicular thereto, the former component is greater than the latter.

It is an advantage of this embodiment that the bubbles of produced gas have a convenient way out of the reactor, without creating "dead zones" in the areas in which the reaction should continue to take place (i.e., the top surfaces of the protrusions).

In a particular embodiment, the pattern of protrusions is such that average width of the channels within each respective set increases along the common direction. In other words, the channels defined by the protrusions widen from the end nearest to the supply side to the end nearest to the exit side.

It is an advantage of this embodiment that bubbles of increasing size, notably as a result of the gradual coalescence of smaller bubbles, have an appropriate exit path.

In an embodiment of the bipolar electrode according to the present invention, the planar main body is made of metal.

For the purposes of the bipolar electrode according to the invention, metals provide a good tradeoff between molding ability and shape stability. Preferred metals include steel and titanium.

According to an aspect of the present invention, there is provided an electrolysis unit comprising a plurality of bipolar electrodes as described above and associated ion exchange membranes placed between the bipolar electrodes, the electrodes being electrically connected in series and arranged in a stack.

Thanks to the efficient flow properties of the bipolar electrodes, a membrane-electrode assembly can be constructed which has no need for forced convection means. Hence, the electrodes can be combined in a very dense stack to produce a compact and reliable electrolysis unit.

According to an aspect of the present invention, there is provided an energy storage and supply unit comprising the aforementioned electrolysis unit, a fuel cell, an electrical current interface, and a hydrogen storage tank; said electrolysis unit being coupled to said electrical current interface for receiving current and to said hydrogen storage tank for storing produced hydrogen; and said fuel cell being coupled to said electrical current interface for supplying current thereto and to said hydrogen storage tank for receiving stored hydrogen.

The advantages of the bipolar electrode according to the invention may be applied to an electrolysis unit and/or a fuel cell to produce an efficient, compact, and reliable energy storage and supply unit, which can be used instead of batteries in energy storage applications.

According to an aspect of the present invention, there is provided the use of the aforementioned electrolysis unit for the production of hydrogen.

According to an aspect of the present invention, there is provided a method for producing the bipolar electrode as described above, the method comprising: embossing a first metal sheet and a second metal sheet with the corresponding patterns of protrusions; and joining the first metal sheet and the second metal sheet together with the protrusions facing outwards so as to produce the planar main body.

It is an advantage of this method that the planar main body can be produced with appropriate protrusion patterns on both side, using only metal sheets of substantially uniform thickness.

In an embodiment of the method according to the present invention, the first metal sheet and the second metal sheet are embossed prior to cutting the first metal sheet and the second metal sheet out of a common mother sheet.

It is an advantage of this embodiment that the embossing for both sides of the planar main body can happen in a single step.

In an embodiment, the method according to the present invention further comprises applying a surface coating to the first metal sheet and the second metal sheet.

In an embodiment of the method according to the present invention, the embossing is carried out by hydro forming.

It is an advantage of this embodiment that protrusions, even multiple levels of protrusions, can be produced with very high precision without damaging the surface of the material. It is a further advantage that hydroforming is a single-stage process.

U.S. Pat. No. 1,328,981 to Edward O. Benjamin discloses an electrode for use in an electrolytic cell, comprising a plate of conducting material having its surface formed or provided with flat-topped projections vertically aligned so as to form upward channels between them. This electrode is intended for use in monopolar arrangements, and its protrusions do not have the characteristics of those of the electrodes according to the present invention.

International patent application publication WO 91/00379 A1 in the name of Heraeus Elektroden discloses an electrolytic cell for electrolytic processes in which gas is evolved, comprising at least one electrode with parallel electrode elements. The electrode elements have a thickness up to three times the average diameter of a released bubble and the capillary gap between the electrode elements is such that the gas bubbles move through the electrodes essentially in the direction of the electric field between the reaction surfaces of the anode and the cathode, or the opposite direction. This electrode is intended for use in monopolar arrangements, and its protrusions do not have the characteristics of those of the electrodes according to the present invention.

International patent application publication WO 2009/043600 A1 in the name of Reinz Dichtung GmbH discloses an electrochemical system as well as a bipolar plate for use in an electrochemical system. The electrochemical system consists of a layering of several cells, which in each case are separated from one another by bipolar plates, wherein the bipolar plates comprise openings for the cooling or for the removal and supply of operating media to the cells, and the layering may be set under mechanical compressive stress, wherein at least one cell comprises an electrochemically active region which is surrounded by a boundary wall of the bipolar plate, and a channel structure of the bipolar plate is provided within the electrochemically active region, for the uniform media distribution, wherein at least one gas diffusion layer is provided for the micro-distribution of media. Limitation elements are provided in the border region between the channel structure as well as the boundary wall, for avoiding fluid from bypassing between the channel structure and the boundary wall, wherein the gas diffusion layer covers the channel structure and/or at least parts of the limitation elements. The described bipolar plate is suitable for use in fuel cells, but not in electrolysis cells. Its protrusions do not have the characteristics of those of the electrodes according to the present invention.

Some embodiments of apparatus and/or methods in accordance with embodiments of the present invention are now described, by way of example only, and with reference to the accompanying drawings.

BRIEF DESCRIPTION OF THE DRAWINGS

FIG. 6 provides a flow chart of a method for producing a bipolar electrode according to an embodiment of the present invention; and FIG. 7 is an annotated photographic reproduction of an exemplary bipolar electrode in accordance with an embodiment of the present invention.

The following description of embodiments of the present invention is directed to the application of electrolysis of water. This is intended to clarify and not to limit the invention. A skilled person will understand that the invention also applies to the electrolysis of other substances than water, for instance to chlor alkali electrolysis. In addition, a skilled person will understand that electrodes and assemblies according to the present invention may in principle also be used for a reverse process, i.e. for the process of converting hydrogen and oxygen into water and electricity, as occurs in a fuel cell.

As decentralized generation of electricity from renewable and in particular intermittent energy sources becomes more prevalent, inter alia as a result of the increasing number of photovoltaic panels installed by households, and as return of surplus energy to the grid is not always desirable or even possible, the need for an efficient storage of surplus energy becomes more pressing. Batteries have been used for this purpose, but these have limited efficiency. Combined electrolysis and fuel cell units are a promising alternative, which present a higher conversion efficiency. In these combined units, any available surplus electricity is used to produce gaseous hydrogen by electrolysis, and the stored hydrogen is used to power the fuel cell (in combination with stored or atmospheric oxygen) to produce electricity when the demand exceeds the immediate production by the renewable source.

The electrolysis cell and/or the fuel cell of the above mentioned unit is advantageously built up as a stacked membrane-electrode assembly (MEA), in which the electrodes are electrically connected in series. Each one of the electrodes of such a stack is placed at different electrical potential, in a monotonously increasing or decreasing sequence, such that each electrode acts as a cathode towards the electrolyte on one side, and as an anode towards the electrolyte on the other side.

Figure 1:
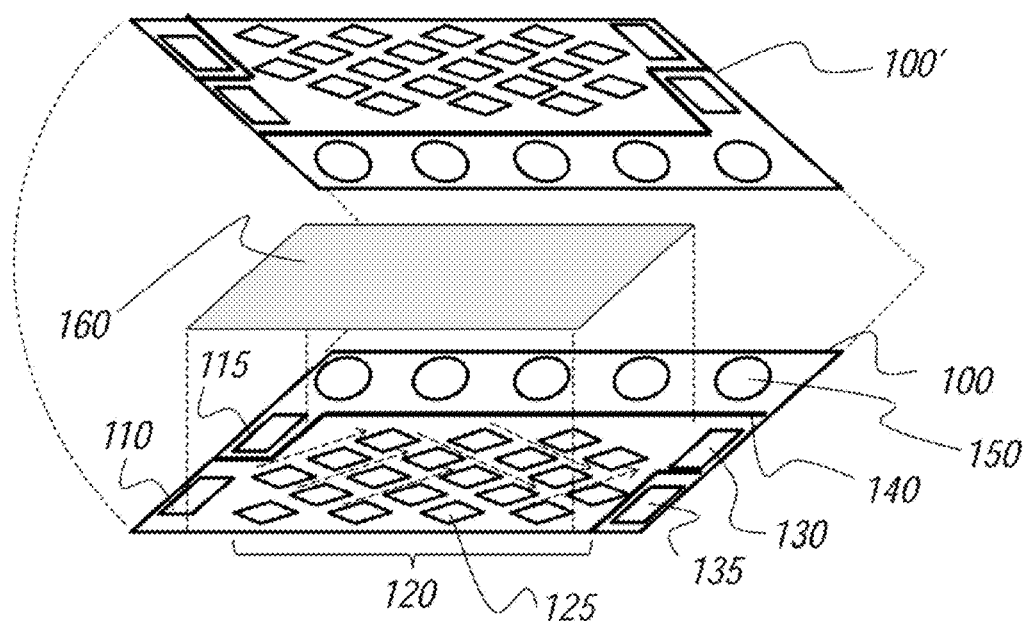
FIG. 1 schematically illustrates an exemplary bipolar electrode in accordance with an embodiment of the present invention.

FIG. 1 schematically illustrates a first bipolar electrode 100 and a second bipolar electrode 100' according to a general embodiment of the present invention. The top side of the first electrode 100 and the bottom side of the second electrode 100' are visible in the selected view. The position of an ion exchange membrane 160 between the electrodes is also illustrated. Only the first electrode 100 will be described in detail, the second one being substantially identical. Certain features of the electrode have been represented in a simplified manner.

The electrode 100 comprises a planar main body with a supply opening 110, an active zone 120 comprising a plurality of protrusions 125, and an exit opening 130. A flow path is thus provided on one side of the membrane 160 from the supply opening 110 via the active zone 120 and to the exit opening 130. An additional supply opening 115 and exit opening 135 are provided to provide a flow path on the other side of an ion exchange membrane, via the active zone on the other side of the electrode 100. Thanks to judiciously placed barriers 140, the flow path between the pair of openings 110/130 pertaining to the first side of the first electrode 100 is not in fluid communication with the flow path between the pair of openings 115/135 pertaining to the second side of the first electrode 100 or the corresponding flow path on the second side of the second electrode 100'.

The planar main body, and in particular the active zone 120, are preferably substantially polygonal, more preferably substantially rectangular; they may be perfect polygons or perfect rectangles f. In use, the bipolar electrode 100 is normally arranged vertically, such that the direction of flow, as imposed by the rising direction of gas bubbles in a liquid due to gravity, is substantially parallel with the long edge of the rectangle. To ensure proper coalescence of the produced gas bubbles, the actual flow path between the supply opening 110 and the exit opening 130 should be as long as possible, thus preferably comprising a diagonal path across the active zone.

The protrusions 125 have a substantially planar (ideally, planar) top portion, the top plane of each protrusion being parallel with the plane of the main body of the electrode 100. By "substantially planar" is generally meant that the surface may deviate from a strictly planar form due to production tolerances, or due to the presence of further protrusions on top of the surface of the main protrusions. The protrusions 125 are present on both sides of the main body in a corresponding pattern, such that the top plane of a protrusion on the top side of the main body of one electrode will always be in proximity of the top plane of a protrusion on the bottom side of the main body of the next electrode up the stack, so as to create an adequate active zone for electrolysis. However, the protrusions on either side of the planar main body are not necessarily identical. In particular, their height may vary. In an exemplary embodiment for use in electrolysis, the channel depth (protrusion height) at the air/oxygen side (i.e., the side acting as the anode) may be 1.0 mm or thereabout, and the channel depth (protrusion height) at the hydrogen side (i.e., the side acting as the cathode) may be 0.6 mm or thereabout.

The protrusions 125 preferably cover 20% to 80% of the surface of the active zone 120, most preferably 40% to 50%.

The general direction from 110 to 130 will be referred to as the "flow path direction". The direction corresponding to the left-right axis in FIG. 1 will be referred to as the "direction of flow" or the "length direction", regardless of whether the electrode is elongate in this direction or not. The "direction of flow" corresponds to the vertical direction when the electrode is placed in its position for normal use. The "flow path direction" preferably doesn't deviate much from the length direction. A deviation between 5° and 15° is preferred. Good results have been obtained with a deviation of 9°.

FIG. 1 further shows a number of depressions 150. The shape of the depressions 150 is not particularly critical; the depressions 150 may be, inter alia, square, rectangular, circular or elliptic, with circular depressions 150 being preferred. The depressions 150 are advantageously located at part of the periphery of the electrode 100; when the planar main body of the electrode 100 has or has substantially the shape of a polygon, in particular of a rectangle, the depressions 150 are preferably located along one side of the polygon, much preferably all along one side of the polygon. Besides, the centers of mass of the depressions 150 are desirably substantially aligned, when not perfectly aligned, with each other. The depressions 150 may be used in cooperation with corresponding depressions of an adjacent electrode 100' to mechanically secure two side-by-side membrane-electrode assemblies, for instance an electrolysis unit and a fuel cell. Depressions 150 may also be useful for ensuring thermal transfer from one side of the electrode 100 to the other side thereof; hence, in a preferred embodiment, the depressions 150 can provide a device exhibiting a substantially isothermal behaviour (ideally, an isothermal behaviour). Adjacent electrodes 100 and 100' are advantageously connected to each other at part of their periphery (which part contains the depressions 150) through a layer composed of a thermally conductive polymer composition; the thermally conductive polymer composition comprises desirably a polymer and thermally conductive inorganic particles. The polymer can be or include a polyoxymethylene or an aromatic polycondensate Aromatic polycondensates can be any polymers obtained by a polycondensation reaction, of which more than 50 wt. % of the repeat units comprise at least one aromatic moeity. Suitable aromatic polycondensates in accordance with the present invention are poly(aryl ether sulfone)s [such as bisphenol A polysulfones (PSU), polyethersulfones (PES) and polyphenylsufones (PPSU)], semi-aromatic polyamides [such as polyphthalamides, MXD6 and MXD10], wholly aromatic polyesters (LCP), polyphenylene sulfides (PPS), polyamideimides, polyimides, polyetherimides and mixtures thereof. In a particular embodiment, the polymer includes an aliphatic polycondensate in addition to the aromatic polycondensate, desirably in a weight ratio aliphatic polycondensate; aromatic polycondensate of at most 0.20 (for example, the polymer can be a mixture of MXD6 with at least one aliphatic polyamide such as nylon 6 or nylon 66). The weight of the polymer, based on the total weight of the polymer composition, ranges usually from 10 to 90 wt. %, preferably from 30 to 70 wt. %. Preferred thermally conductive inorganic particles are ceramic particles, in particular oxides, nitrides, carbides and silicides of an element chosen from Al, B, Be, Ce and Zr, and mixtures thereof; very preferred thermally conductive inorganic particles are particles of aluminum oxide, particles of boron oxide, particles of boron nitride and mixtures thereof; the weight of the inorganic particles, based on the total weight of the polymer composition, ranges usually from 10 to 90 wt. %, preferably from 30 to 70 wt. %; it can be of about 50 wt. %. The polymer composition may further comprise additives, such as heat stabilizers, light stabilizers and flow modifiers; when present, their amount does not generally exceed 25 wt. % and it is often of at most 5 wt. %; in certain embodiments, the polymer composition consists essentially of the polymer and the thermally conductive inorganic particles. The polymer forms generally the matrix of the polymer composition, while the thermally conductive inorganic particles are generally dispersed in said matrix. The polymer composition may be further characterized by its thermal conductivity; this one, when measured at room temperature (23° C.) is advantageously of at least 2.0 W/(m.K), preferably at least 4.0 W/(m.K), more preferably at least 6.0 W/(m.K) and still more preferably at least 7.0 W/(m.K). It is usually of at most 20.0 W/(m.K), and very often of at most 10.0 W/(m.K). Embodiments of the invention are based inter alia on the insight that a judicial choice of the shape of the protrusions 125 improves the formation of gas bubbles that progressively aggregate to facilitate their transport through the liquid electrolyte in the direction of flow.

Embodiments of the invention are based inter alia on the insight that a judicial design of the pattern of the protrusions will allow the creation of virtual channels between the protrusions, whose primary function is to supply water to the reaction sites, and whose secondary function is to ensure that the gas bubbles can efficiently be removed from the electrode. Such a virtual channel may be defined by the parallel sides of polygonal protrusions, which are preferably arranged along straight lines. These virtual channels are indicated in FIG. 1 as dashed arrows. The channels preferably have a width of 1 mm to 5 mm, more preferably between 2 and 4 mm, and most preferably 2.6 mm, 3 mm, or therebetween.

Good results have been obtained with polygonal protrusions, in particular protrusions shaped as parallelograms, and most preferably diamond-shaped protrusions. More in particular, diamond-shaped protrusions with one diagonal, preferably the long diagonal, oriented in the length direction, as illustrated in FIG. 1, have given good results, as the symmetrically oriented acute angle of the diamond is well suited to divide the oncoming flow of fluids over the surface of the electrode. The angle pointed towards the oncoming flow is preferably acute, more preferably in the range of 40° to 80°, and most preferably about 60°, which avoids creating ridges onto which oncoming gas bubbles would cling. Conversely, the diametrical angle, pointed towards the departing gas bubbles, is also preferably acute, more preferably in the range of 40° to 80°, and most preferably about 60°, to allow bubbles that travel along the edge towards the angle to overcome the surface tension barrier and break loose from the protrusion. The protrusions preferably have a size in the order of 10 mm.

Figure 2A:
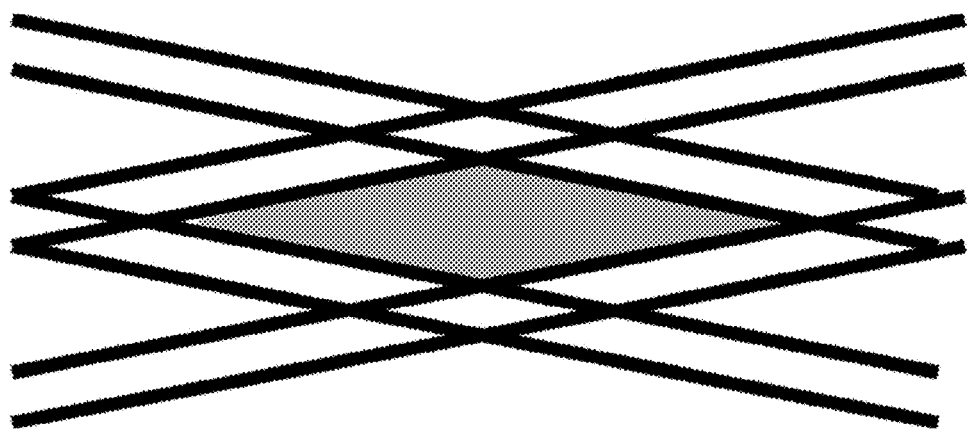
FIG. 2 schematically illustrates alternative shapes for the protrusions used in electrodes according to embodiments of the present invention.

Protrusions in the shape of parallelograms correspond to a pattern consisting of two sets of parallel channels. When the channels are spaced at regular distances, the same distance being used for each set, the corresponding protrusions will be diamond shaped, as illustrated in FIG. 2a. Diamond-shaped protrusions are preferably oriented with their longest diagonal along the direction of flow. They preferably have a length (long diagonal) between 10 mm and 20 mm, more preferably between 14 mm and 17 mm, for instance approximately 15.8 mm.

More generally, the protrusions may be shaped as convex polygons. If a polygon is arranged in such a way that one or some sides of the polygon are normal to the direction of flow, their combined length should not exceed 35% of the total perimeter of the polygon. The polygon is preferably oriented in such a way that the corner with the smallest internal angle is oriented with respect to the centroid of the polygon in a direction substantially parallel to the direction of flow.

In order to benefit from the aforementioned effects, it is preferred that a substantial portion of the protrusions provided on the planar main body, for example at least half of them, are shaped as convex polygons. More preferably, at least 60% of the protrusions are shaped as convex polygons. Most preferably, at least 75% of the protrusions are shaped as convex polygons. In order to avoid trapping of gas bubbles at the edges of the protrusions to the greatest possible extent, it is recommended use only protrusions shaped as convex polygons.

Figure 2B:
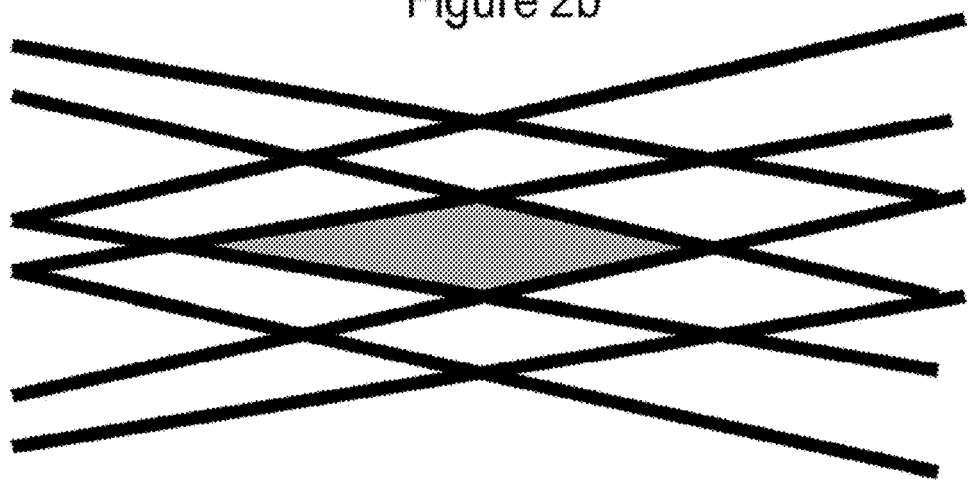

In a particularly advantageous arrangement, the size and/or arrangement of the protrusions is such that the channels defined between them have a gradually increasing width in the direction of flow, to accommodate gas bubbles of increasing size (due to the aggregation of growing numbers of smaller gas bubbles). The corresponding protrusions have a shape of a kite as illustrated in FIG. 2b, rather than a perfect parallelogram or diamond, because the exit-side corner (the corner pointed to the exit opening, i.e. pointing substantially in the direction of flow) will be less acute than the corner pointing to the incoming flow.

Figure 3A:
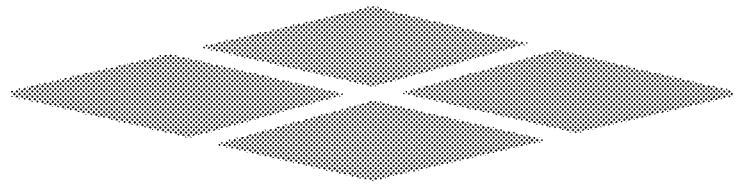
FIG. 3 schematically illustrates further alternative shapes for the protrusions used in electrodes according to embodiments of the present invention, having a second level of channels.
Figure 3B:
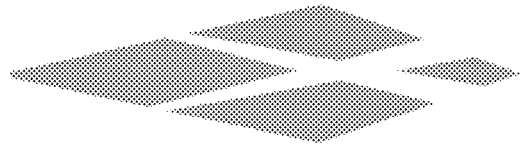
Figure 3C:
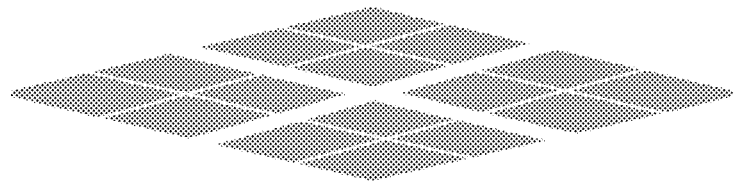

The substantially planar top surface of the protrusions may in fact support a further level of protrusions and channels, allowing the active zones of the electrodes to more efficiently discharge the formed gas pockets into larger gas bubbles travelling through the broader channels present between the first level of protrusions. Thus, every protrusion may for example have four second-level protrusions. The application of this principle is schematically illustrated in FIG. 3a for diamond-shaped protrusions and FIG. 3b for kite-shaped protrusions. In the former case, the second-level protrusions are preferably also diamonds. The process may be repeated to produce a third level of protrusions, as illustrated in FIG. 3c for the case of diamond-shaped protrusions, and even higher-order protrusions.

Figure 4:
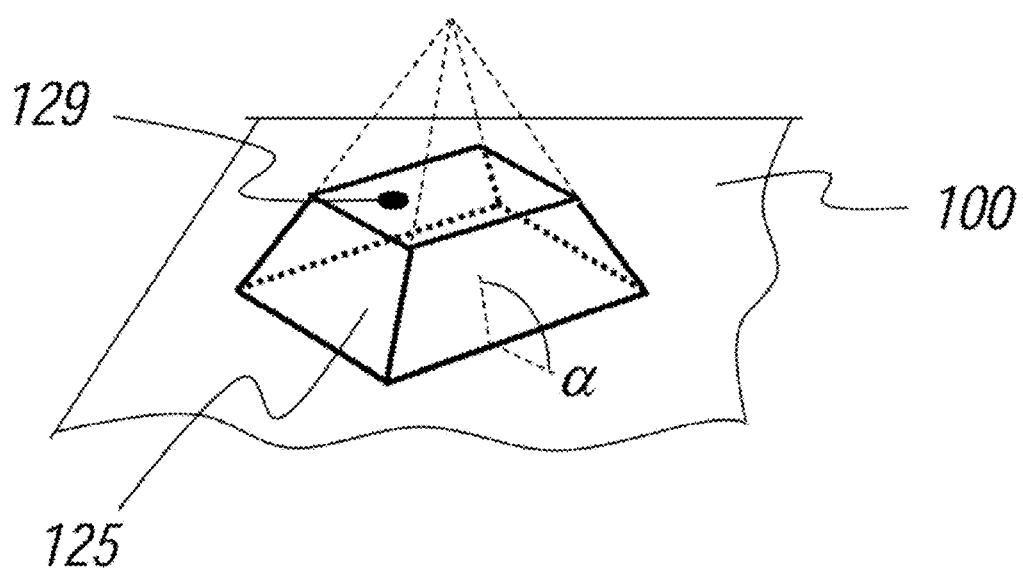
FIG. 4 schematically illustrates the geometric transformation projecting the footprint of a protrusion onto its top face.

It will be understood that the top face of the protrusions does not necessarily have exactly the same shape as its footprint in the plane of the main body of the electrode. If these shapes are identical, with a 1/1 ratio of the area of the top side of the protrusion to the area of its geometric base, the protrusion would have a prismatic form which stands out from the plane of the main body. Although it is desirable to approximate this ratio to optimize the total active area of the electrode, a 1/1 ratio is not optimal from a mechanical point of view, because cracks in the material surface might appear at the right or acute angles, and the upright sides of the prism would undergo substantial thinning. Hence, the shape of the top plane of the protrusions is preferably reduced in size relative to its footprint, most particularly preferably by means of a homothetic transformation. Such a homothetic transformation is schematically shown in FIG. 4 for diamond-shaped protrusion 125, the result being a shape having the mantle and top face 129 of a clipped pyramid. The angle between the main body of the electrode and each of the sides of the protrusion is preferably obtuse (one such angle is indicated in FIG. 4 with the symbol a) to minimize the risk of damage (cracking) at the surface. This geometrically corresponds to the constraint that the orthogonal projection of the top face onto the main body of the electrode is completely inscribed into the footprint of the protrusion 125. Preferably, the ratio of the area of the top side of the protrusion to the area of its geometric base is at least ¼, more preferably more than ½, and even more preferably more than ⅔.

The protrusions 125 preferably have a symmetry axis parallel to the length direction. Alternatively, they may have a symmetry axis parallel to the flow path direction.

The bipolar electrode of the invention may be very compact. The active area of the electrode may be 100 cm$^2$ or less, preferably even 50 cm$^2$ or less. The bipolar electrode of the invention may be used in an electrolysis unit or in a fuel cell, typically constructed as a stacked membrane-electrode assembly (MEA).

Figure 5:
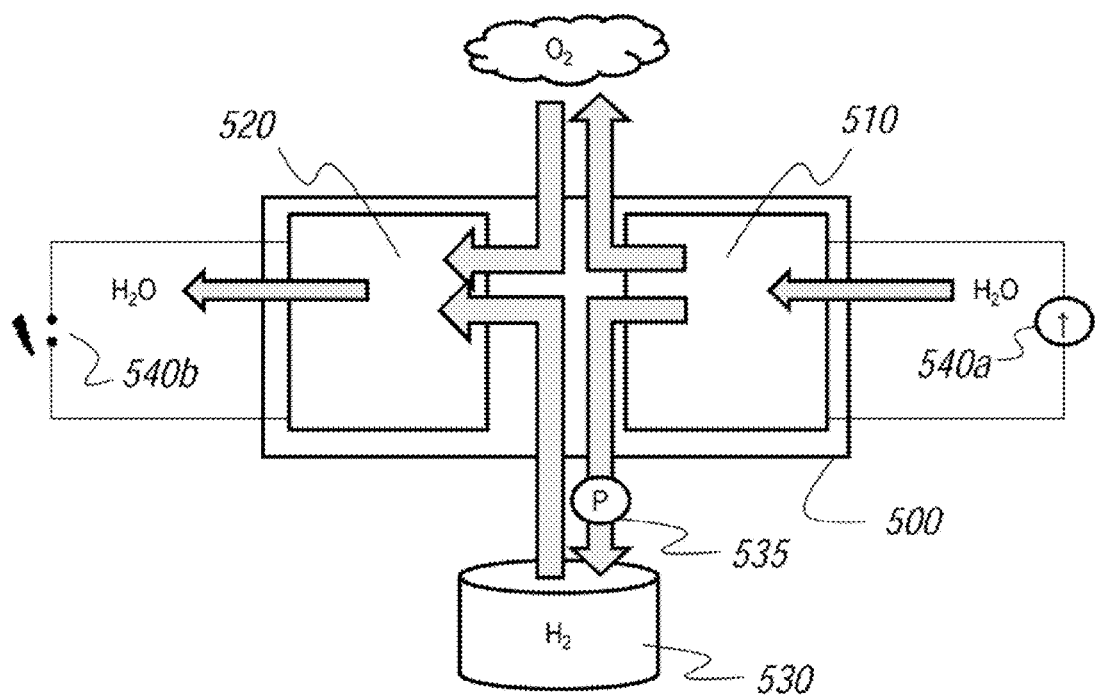
FIG. 5 schematically illustrates an energy storage and supply unit according to an embodiment of the present invention.

With reference to FIG. 5, an electrolysis unit and/or a fuel cell constructed with bipolar electrodes 100 according to the invention may be used in an energy storage and supply unit 500 comprising an electrolysis unit 510, a fuel cell 520, an electrical current interface 540 a/b, and a hydrogen storage tank 530. The electrolysis unit 510 includes a set of bipolar electrodes 100 as described before, connected in series in a membrane-electrode assembly. The bipolar electrodes 100 are preferably arranged substantially vertically, to facilitate the natural migration of the formed gas bubbles as a result of the difference in density between the gas and the surrounding water. The electrolysis unit 510 is coupled to the electrical current interface 540a and the hydrogen storage tank 530, in order to withdraw the necessary current for the electrolysis process and to store the produced hydrogen. The fuel cell 520 is coupled to the electrical current interface 540b and the hydrogen storage tank 530 in order to withdraw stored hydrogen as fuel and to supply the produced electrical current to the grid or a consumer of electric energy. In normal operation, at most one of the electrolysis unit 510 and the fuel cell 520 is active at any given time.

For clarity purposes, the electrical current interface has been illustrated as a separate input interface 540a and output interface 540b. In practice, this may be a common interface. It will be understood that any produced electricity may be simultaneously consumed or returned to the grid in accordance with the needs and preferences of the user.

To reduce the space requirements of the energy storage and supply unit 500, the produced hydrogen is preferably stored under pressure. One or more pumps, schematically illustrated as a pump unit 535, may be used to pressurize the hydrogen gas for storage up to a pressure preferably in excess of 10 MPa, more preferably in excess of 50 MPa, and most preferably at or around 70 MPa.

The oxygen produced by the electrolysis unit 510 may be discharged into the atmosphere, or stored in an adequate container. Likewise, the oxygen required by the fuel cell 520 may be withdrawn from the atmosphere (which normally contains around 21% of molecular oxygen by volume) or from an adequate container (which preferably contains a gas with a higher oxygen content than atmospheric air).

The water required by the electrolysis unit 510 may be obtained from a utility water supply or an adequate container. Alternatively or additionally, atmospheric water may be used if it is available, for example from the exhaust of an air conditioning appliance. The water produced by the fuel cell 520 may be discharged as vapor into the atmosphere, where this is acceptable from an environmental point of view, or stored for future use. The electrolysis unit 510 may operate with water at atmospheric pressure. In an embodiment, the electrolysis unit 510 operates with water at pressures up to 10 bar. In another embodiment, the electrolysis unit 510 operates with water at pressures up to 50 bar.

Each stage of the electrolysis unit may correspond to a stage of the fuel cell, whereby continuous or joined metal sheets are each used as an electrode of the electrolysis unit in the electrolysis zone and as an electrode of the fuel cell in the fuel cell. A continuous membrane, such as the one described in patent application EP 2 424 105 A in the name of the present applicant, the content of which is incorporated into the present application by this reference, may extend over both zones. This allows for an extremely compact realization of the aforementioned energy storage and supply unit 500. It will be understood that in such an assembly, the necessary measures must be taken to avoid fluid communication between the electrolysis zone and the fuel cell zone.

A process for producing a bipolar electrode according to the present invention will now be described with reference to FIG. 6. Although the steps of the method are illustrated in FIG. 6 in a particular order, this is order must be considered exemplary and non-limiting.

The main body of the electrode may advantageously be produced from two pieces of sheet metal, which will correspond to the top side and the bottom side of the planar main body. The advantage of using a pair of metal sheets, is that the protrusions of the bottom side and the top side may be formed independently in steps 610 and 620. At this same stage, appropriate openings 110, 115, 130, 135 and barriers 140 may also be provided.

It must be noted that the two sheets may, at this stage, be contained in a single mother sheet or matrix, from which they will be cut out at a later stage, in steps 650 and 660. This way of operating allows an efficient simultaneous embossing of both sheets, as well as the sheets required for additional electrodes.

The two sheets are then placed on top of each other with the protrusions facing outwards 670 and optionally joined by any suitable means.

The sheets are preferably between 100 μm and 1000 μm in thickness, more preferably between 100 μm and 500 μm, and most preferably between 100 μm and 200 μm. The metal is preferably stainless steel, most preferably 316 L grade stainless steel. Stainless steel provides a good trade-off between material strength and moldability. Another preferred material is titanium, which also lends itself to other manufacturing techniques, such as 3D printing. Various coatings or surface treatments may be applied to the metal, e.g. in steps 630 and 640, in order to make it more suitable for the intended process, notably catalytic electrolysis of water. The coating or surface layer may present a porous structure, which provides nucleation sites for the formation and coalescence of gas bubbles.

The protrusions in each sheet, which correspond to dimples if viewed from the reverse side of the sheet, may be formed by moulding or stamping. One particularly advantageous way of forming the protrusions, is to emboss them by hydro forming. This is a type of die forming that uses a high pressure hydraulic fluid, typically up to 2000 bar, and in some embodiments even up to 2500 bar, to press the working material into a die, without melting the working material.

FIG. 7 is an annotated photographic reproduction of an exemplary bipolar electrode in accordance with an embodiment of the present invention. It is, in all relevant aspects, similar to the embodiment shown in FIG. 1, and has been provided with corresponding reference signs. Reference is made to the description of FIG. 1 for further details. Special attention is drawn to the upper surface of the individual diamond-shaped protrusions 125, which are in turn provided four smaller diamond-shaped protrusions, in accordance with the principle illustrated in FIG. 3a and explained hereinabove.

Although certain features and advantages of the invention have only been described hereinabove in connection with embodiments of the electrode or embodiments of the process for manufacturing the electrode, it must be recognized that this is done for clarity reasons only, and that the features are in fact interchangeable unless it is stated otherwise.

The invention has been described hereinabove with reference to a limited number of concrete embodiments. These embodiments are only intended to clarify the invention, and not to limit its scope, which should be determined in accordance with the enclosed claims.

While the invention as described above pertains to electrodes according to claim 1, as well as to an electrolysis unit comprising same, a corresponding energy storage and supply unit, and use thereof, the inventors have also found that similar units may also be used with bipolar electrodes other than those according to claim 1.

Accordingly, a separate inventive aspect disclosed herein consists of an electrolysis unit comprising a plurality of bipolar electrodes and associated ion exchange membranes placed between said bipolar electrodes, said electrodes being electrically connected in series and arranged in a stack, wherein said electrodes comprise a planar main body having a first side and a second side, each of said first side and said second side being provided with a corresponding pattern of protrusions, wherein each of said protrusions has a geometrical base within the plane of said planar main body and a planar top side, the orthogonal projection of said top side onto said main body being contained in said geometrical base, and wherein the top sides (129) of the respective protrusions (129) of said first side and said second side lie in two planes parallel to said planar main body.

Thanks to the efficient flow properties of the bipolar electrodes, a membrane-electrode assembly can be constructed which has no need for forced convection means. Hence, the electrodes can be combined in a very dense stack to produce a compact and reliable electrolysis unit.

Preferably, in the bipolar electrodes, the ratio of the area of the planar top side (129) of said protrusions to the area of their respective geometric base, exceeds ¼. Preferably, in the bipolar electrodes, said pattern of protrusions is repeated on a smaller scale on said top sides of said protrusions. Preferably, in the bipolar electrodes said pattern of protrusions is such that two sets of straight channels are formed, wherein the channels within each respective set have an axis in a common direction, said common direction having its main component in the intended direction of flow. Preferably, in the bipolar electrodes, said pattern of protrusions is such that average width of the channels within each respective set increases along said common direction. Preferably, in the bipolar electrodes, the planar main body is made of metal.

A further separate inventive aspect disclosed herein consists of an energy storage and supply unit comprising the aforementioned electrolysis unit, a fuel cell, an electrical current interface, and a hydrogen storage tank; said electrolysis unit being coupled to said electrical current interface for receiving current and to said hydrogen storage tank for storing produced hydrogen; and said fuel cell being coupled to said electrical current interface for supplying current thereto and to said hydrogen storage tank for receiving stored hydrogen.

The advantages of the bipolar electrode according to the invention may be applied to an electrolysis unit and/or a fuel cell to produce an efficient, compact, and reliable energy storage and supply unit, which can be used instead of batteries in energy storage applications.

A further separate inventive aspect disclosed herein consists of the use of the aforementioned electrolysis unit for the production of hydrogen.

Should the disclosure of any patents, patent applications, and publications which are incorporated herein by reference conflict with the description of the present application to the extent that it may render a term unclear, the present description shall take precedence.

The invention claimed is:

1. A bipolar electrode for use in an electrolysis unit, said bipolar electrode comprising a planar main body having a first side and a second side, each of said first side and said second side being provided with a corresponding pattern of protrusions, wherein each of said protrusions has a geometrical base within the plane of said planar main body and a substantially planar top side, the orthogonal projection of said top side onto said main body being contained in said geometrical base;

wherein the top sides of the respective protrusions of said first side and said second side lie in two planes parallel to said planar main body;

wherein the base of at least 75% of said protrusions has a convex polygonal shape and wherein the corresponding top side has a shape resulting from a homothetic transformation of said polygonal shape;

and wherein said polygonal shape has at least one side that is oriented in a direction substantially normal to the intended direction of flow, and wherein the total length of said at least one side does not exceed 35% of the perimeter of said polygonal shape, and/or said polygonal shape is oriented in such a way that a vector connecting the centroid of said polygonal shape with a corner of the latter having the smallest internal angle, has a direction that is substantially parallel to the direction of flow;

wherein said pattern of protrusions is such that two sets of straight channels are formed, wherein the channels within each respective set have an axis in a common direction, said common direction having its main component in the intended direction of flow; and wherein said pattern of protrusions is such that average width of the channels within each respective set increases along said common direction.

2. The bipolar electrode according to claim 1, wherein the ratio of the area of the planar top side of said protrusions to the area of their respective geometric base, exceeds ¼.

3. The bipolar electrode according to claim 1, wherein the base of each of said protrusions has a convex polygonal shape and wherein the corresponding top side has a shape resulting from a homothetic transformation of said polygonal shape.

4. The bipolar electrode according to claim 1, wherein the top side is planar and wherein said polygonal shape has at least one side that is oriented in a direction normal to the intended direction of flow, and wherein the total length of said at least one side does not exceed 35% of the perimeter of said polygonal shape, and/or said polygonal shape is oriented in such a way that a vector connecting the centroid of said polygonal shape with a corner of the latter having the smallest internal angle, has a direction that is parallel to the direction of flow.

5. The bipolar electrode according to claim 1, wherein said pattern of protrusions is repeated on a smaller scale on said top sides of said protrusions.

6. The bipolar electrode according to claim 1, wherein the base of at least 75% of said protrusions are shaped as diamonds and wherein the corresponding top side has a shape resulting from a homothetic transformation of said diamonds.

7. The bipolar electrode according to claim 1, wherein the electrode has substantially the shape of a polygon, and contains depressions located at part of its periphery, along one side of the polygon.

8. An electrolysis unit comprising a plurality of bipolar electrodes according to claim 1 and associated ion exchange membrane placed between said bipolar electrodes, said electrodes being electrically connected in series and arranged in a stack.

9. An energy storage and supply unit comprising the electrolysis unit according to claim 8, a fuel cell, an electrical current interface, and a hydrogen storage tank; said electrolysis unit being coupled to said electrical current interface for receiving current and to said hydrogen storage tank for storing produced hydrogen; and said fuel cell being coupled to said electrical current interface for supplying current thereto and to said hydrogen storage tank for receiving stored hydrogen.

10. A method for the production of hydrogen comprising using the electrolysis unit of claim 8.

11. A bipolar electrode for use in an electrolysis unit, said bipolar electrode comprising a planar main body having a first side and a second side, each of said first side and said second side being provided with a corresponding pattern of protrusions, wherein each of said protrusions has a geometrical base within the plane of said planar main body and a substantially planar top side, the orthogonal projection of said top side onto said main body being contained in said geometrical base;

wherein the top sides of the respective protrusions of said first side and said second side lie in two planes parallel to said planar main body;

wherein the base of at least 75% of said protrusions has a convex polygonal shape and wherein the corresponding top side has a shape resulting from a homothetic transformation of said polygonal shape;

and wherein said polygonal shape has at least one side that is oriented in a direction substantially normal to the intended direction of flow, and wherein the total length of said at least one side does not exceed 35% of the perimeter of said polygonal shape, and/or said polygonal shape is oriented in such a way that a vector connecting the centroid of said polygonal shape with a corner of the latter having the smallest internal angle, has a direction that is substantially parallel to the direction of flow; and wherein said pattern of protrusions is repeated on a smaller scale on said top sides of said protrusions.

12. A bipolar electrode for use in an electrolysis unit, said bipolar electrode comprising a planar main body having a first side and a second side, each of said first side and said second side being provided with a corresponding pattern of protrusions, wherein each of said protrusions has a geometrical base within the plane of said planar main body and a substantially planar top side, the orthogonal projection of said top side onto said main body being contained in said geometrical base;

wherein the top sides of the respective protrusions of said first side and said second side lie in two planes parallel to said planar main body;

wherein the base of at least 75% of said protrusions has a convex polygonal shape and wherein the corresponding top side has a shape resulting from a homothetic transformation of said polygonal shape;

and wherein said polygonal shape has at least one side that is oriented in a direction substantially normal to the intended direction of flow, and wherein the total length of said at least one side does not exceed 35% of the perimeter of said polygonal shape, and/or said polygonal shape is oriented in such a way that a vector connecting the centroid of said polygonal shape with a corner of the latter having the smallest internal angle, has a direction that is substantially parallel to the direction of flow; and wherein the base of at least 75% of said protrusions are shaped as diamonds and wherein the corresponding top side has a shape resulting from a homothetic transformation of said diamonds.

* * * * *